(12) United States Patent
Matsumura et al.

(10) Patent No.: US 9,358,724 B2
(45) Date of Patent: Jun. 7, 2016

(54) METHOD FOR PRODUCING DIALYSIS TANK CHAMBER FRAME

(71) Applicant: AGC ENGINEERING CO., LTD., Chiba-shi (JP)

(72) Inventors: Yukio Matsumura, Chiba (JP); Shuichi Ohkawa, Chiba (JP); Tadao Yuki, Chiba (JP); Kazumi Ohshima, Chiba (JP); Kouji Nobuta, Chiba (JP); Taigo Ohsawa, Chiba (JP); Kazuo Kitamura, Chiba (JP)

(73) Assignee: AGC ENGINEERING CO., LTD., Chiba-shi (JP)

( * ) Notice: Subject to any disclaimer, the term of this patent is extended or adjusted under 35 U.S.C. 154(b) by 251 days.

(21) Appl. No.: 14/262,395

(22) Filed: Apr. 25, 2014

(65) Prior Publication Data
US 2014/0231004 A1    Aug. 21, 2014

Related U.S. Application Data

(63) Continuation of application No. PCT/JP2012/077793, filed on Oct. 26, 2012.

(30) Foreign Application Priority Data

Oct. 28, 2011    (JP) .................................. 2011-237130

(51) Int. Cl.
*B29C 65/38* (2006.01)
*B01D 61/50* (2006.01)
(Continued)

(52) U.S. Cl.
CPC ................ *B29C 65/38* (2013.01); *B01D 61/50* (2013.01); *B29C 65/18* (2013.01);
(Continued)

(58) Field of Classification Search
CPC ............ B01D 61/50; B29C 66/91421; B29C 66/73921; B29C 66/8323; B29C 66/472; B29C 66/1122; B29C 66/919; B29C 66/81427; B29C 65/18; B29C 65/38; B29C 70/546
See application file for complete search history.

(56) References Cited

U.S. PATENT DOCUMENTS 4,999,107 A * 3/1991 Guerif .................. B01D 63/084
210/224

FOREIGN PATENT DOCUMENTS

CN    201565259 U    9/2010
JP    54-16914 Y2    7/1979
(Continued)

OTHER PUBLICATIONS

International Search Report mailed Dec. 11, 2012 for PCT/JP2012/077793 filed on Oct. 26, 2012 in English only.

*Primary Examiner* — Daniel McNally
(74) *Attorney, Agent, or Firm* — Oblon, McClelland, Maier & Neustadt, L.L.P.

(57) ABSTRACT

There is provided a method for producing a chamber frame for a dialyzer, which is readily produced, has a stable quality, is inexpensive and is excellent in sealing property and heat resistance.
A cut frame 1 is set on an unshown table of an impulse welder 30, distributors 13 are fitted into communicating passage 9 and communicating passages 11, and a net 15 is positioned so as to cover a central opening 3. Welded portions A and B, and the welded portions C and D are subjected to impulse welding. Mounting of the net 15 as a spacer and mounting of the distributors 13 are carried out simultaneously by a single pressing operation. After that, the welded portions of the net are deburred, and correction work is performed on defects.

5 Claims, 3 Drawing Sheets

(51) Int. Cl.
*B29C 65/18* (2006.01)
*B29C 65/00* (2006.01)
*B29C 70/54* (2006.01)
*B29L 28/00* (2006.01)
*B29C 65/08* (2006.01)
*B29L 31/14* (2006.01)
*B29C 65/78* (2006.01)

(52) U.S. Cl.
CPC .......... *B29C 66/1122* (2013.01); *B29C 66/472* (2013.01); *B29C 66/73921* (2013.01); *B29C 66/81427* (2013.01); *B29C 66/8322* (2013.01); *B29C 66/919* (2013.01); *B29C 66/91421* (2013.01); *B29C 70/546* (2013.01); *B01D 2313/20* (2013.01); *B29C 65/08* (2013.01); *B29C 65/7855* (2013.01); *B29C 66/21* (2013.01); *B29C 66/5346* (2013.01); *B29C 66/71* (2013.01); *B29C 66/929* (2013.01); *B29C 66/949* (2013.01); *B29L 2028/00* (2013.01); *B29L 2031/14* (2013.01)

(56) References Cited

FOREIGN PATENT DOCUMENTS

| | | |
|---|---|---|
| JP | 57-165206 | 10/1982 |
| JP | 1-94903 A | 4/1989 |
| JP | 2-43528 B2 | 9/1990 |
| JP | 10-84862 A | 4/1998 |
| JP | 11-76764 A | 3/1999 |

* cited by examiner

METHOD FOR PRODUCING DIALYSIS TANK CHAMBER FRAME

TECHNICAL FIELD

The present invention relates to a method for producing a chamber frame for a dialyzer, in particular, a method for producing a chamber frame for a dialyzer, which is readily produced, has a stable quality, is inexpensive and is excellent in sealing property and heat resistance.

BACKGROUND ART

There has been known an electrodialyzer which carries out desalination and concentration, utilizing a DC current as a driving power source.

Such an electrodialyzer has many anion exchange membranes and many cation exchange membranes disposed alternately with a chamber frame interposed between adjacent anion and cation membranes and has electrodes disposed on both ends so as to form desalination chambers and concentration chambers between the membranes. The chamber frames may be capable of having a desired service temperature by being produced from a material properly chosen among a various kinds of olefin-based thermoplastic resins.

Each of the chamber frames has been produced as described below. First, a sheet made of an olefin-based thermoplastic resin is cut in a picture frame having an opening in a central part thereof, forming a frame portion of a chamber frame. At the time of forming the frame portion, a liquid supply port and a liquid discharge port are also formed in the frame portion such that a liquid to be treated can pass therethrough.

Then, in order to secure a liquid flow path toward the central opening of the chamber frame from the liquid supply port and the liquid discharge port, distributors are fitted into the chamber frame by injection welding. Next, a polyolefin net, which serves as a spacer for the chamber frame with the distributors fitted thereinto, is positioned so as to cover the central opening of the chamber frame. Then, the net is temporarily welded to the frame portion at plural locations by an ultrasonic spot welder.

After that, this semi-finished product with the net temporarily welded thereto is finished as a finished product by using the ultrasonic spot welder to integrally weld the frame portion and the net with the welding process being divided into several steps.

This method, however, has suffered from breakage of an ion exchange membrane, an adverse effect upon dialysis performance due to an increase in the amount of liquid leak during use of a chamber frame produced by this method, and another problem, which are caused by sag of the net caused during temporarily welding, the occurrence of a wrinkle caused by division of a welding process into several steps, the presence of a large thickness irregularity in the welded portions of the olefin-based thermoplastic resin and the polyolefin net.

Further, various studies from several aspects have been made with regard to the simplification in the working process. For example, there has been proposed a method for using a chamber frame made of a foamed member having a lower deformation temperature to heat than a net as a spacer such that the chamber frame and the net can be integrated by heat (see Patent Document 1 listed below).

PRIOR ART DOCUMENT

Patent Document

Patent Document 1: JP-B-2-43528

DISCLOSURE OF INVENTION

Technical Problem

It is, however, presumed that the chamber frames produced by this proposed method are usable only at ordinary temperatures because it is presumed that the material of the foamed member is limited and the temperature for welding is not higher than 120° C. in this method.

Additionally, this proposed method has disadvantages of requiring, e.g. a step for cutting a liquid supply duct and a step for independently placing a film in a distributor portion.

The present invention has been proposed, taking into account the above-mentioned problems. It is an object of the present invention to provide a method for producing a chamber frame for a dialyzer, which is readily produced, has a stable quality, is inexpensive and is excellent in sealing property and heat resistance.

Solution to Problem

The present invention provides a method for producing a chamber frame for a dialyzer, which includes a frame having an opening serving as a flow path for a liquid to be treated, a liquid supply port and a liquid discharge port and made of a thermoplastic resin, and a resin net welded into a peripheral part of the frame adjacent to the opening, including integrally welding the net into the frame with a width of not larger than 10 mm from an inner peripheral edge of the opening at a heating temperature of 140° C. to 220° C. by impulse heat-welding (as defined in claim 1).

The resin net is integrally welded into the thermoplastic resin frame by impulse heat-welding. It is preferred that the welded portion between the net and the frame have a width of not larger than 10 mm, taking into account the thermal deformation of the chamber frame and the strength of a part of the chamber frame with the net being welded thereinto.

The heating temperature slightly varies, depending on the material of a used net and the material of a used frame, and may be 140° C. to 220° C., preferably 150° C. to 165° C., although the heating temperature should be properly adjusted so as to match with the pressure applied by a heating press and with a heating period of time.

In accordance with this producing method, it is possible to obtain a chamber frame for a dialyzer, which is readily produced, has a stable quality, is inexpensive and is excellent in sealing property and heat resistance.

In the producing method according to the present invention, the heater used for the impulse heat-welding may have dimensions of 200 mm to 2,000 mm in length and 3 mm to 12 mm in width, and have a heating period of time of 0.5 sec to 5 sec with a pressure of 0.05 MPa to 2.0 MPa being applied (as defined in claim 2).

It is preferred that a heater for welding the net be about 200 mm to about 2,000 mm in length, which varies on the size of the chamber frame. It should be noted that such a wide range of welding is difficult to be realized by means of a conventionally used ultrasonic welder.

It is preferred that an impulse welder apply a pressure of 0.05 MPa to 2.0 MPa, preferably 0.5 MPa to 1.0 MPa of the heater portions during heat-pressing, taking into account thickness accuracy and a deformation amount in a heat-welded portion. It is preferred that the heating period of time for the heat-welded portion be within a range of 0.5 sec to 5 sec, taking into account the prevention of thermal deformation in the chamber frame, thickness accuracy and workability, although the heating period of time is affected by the material of the sheet forming the chamber frame, the material of the net, the heating temperature and the pressure applied by the press.

Further, in the producing method according to the present invention, a distributor may be disposed in a communicating passage between the opening and the liquid supply port or between the opening and the liquid discharge port, and the impulse heat-welding may be employed such that the distributor is integrally welded into the frame at the same time as the net is welded into the frame (as defined in claim 3).

The mounting of the net and the mounting of the distributor may be simultaneously integrated by subjecting the net and the distributor to heat-pressing by a single shot using the impulse welder. Thus, it is possible to simplify the working process and reduce labor costs in production.

Advantageous Effects of Invention

As explained, in accordance with the present invention, a net is integrally welded into a frame with a width of not larger than 10 mm from an inner peripheral edge of the opening of the frame at a heating temperature of 140° C. to 220° C. by impulse heat-welding. Thus, it is possible to obtain a chamber frame for a dialyzer, which is readily produced, has a stable quality, is inexpensive and is excellent in sealing property and heat resistance.

DESCRIPTION OF EMBODIMENTS

Figure 1:
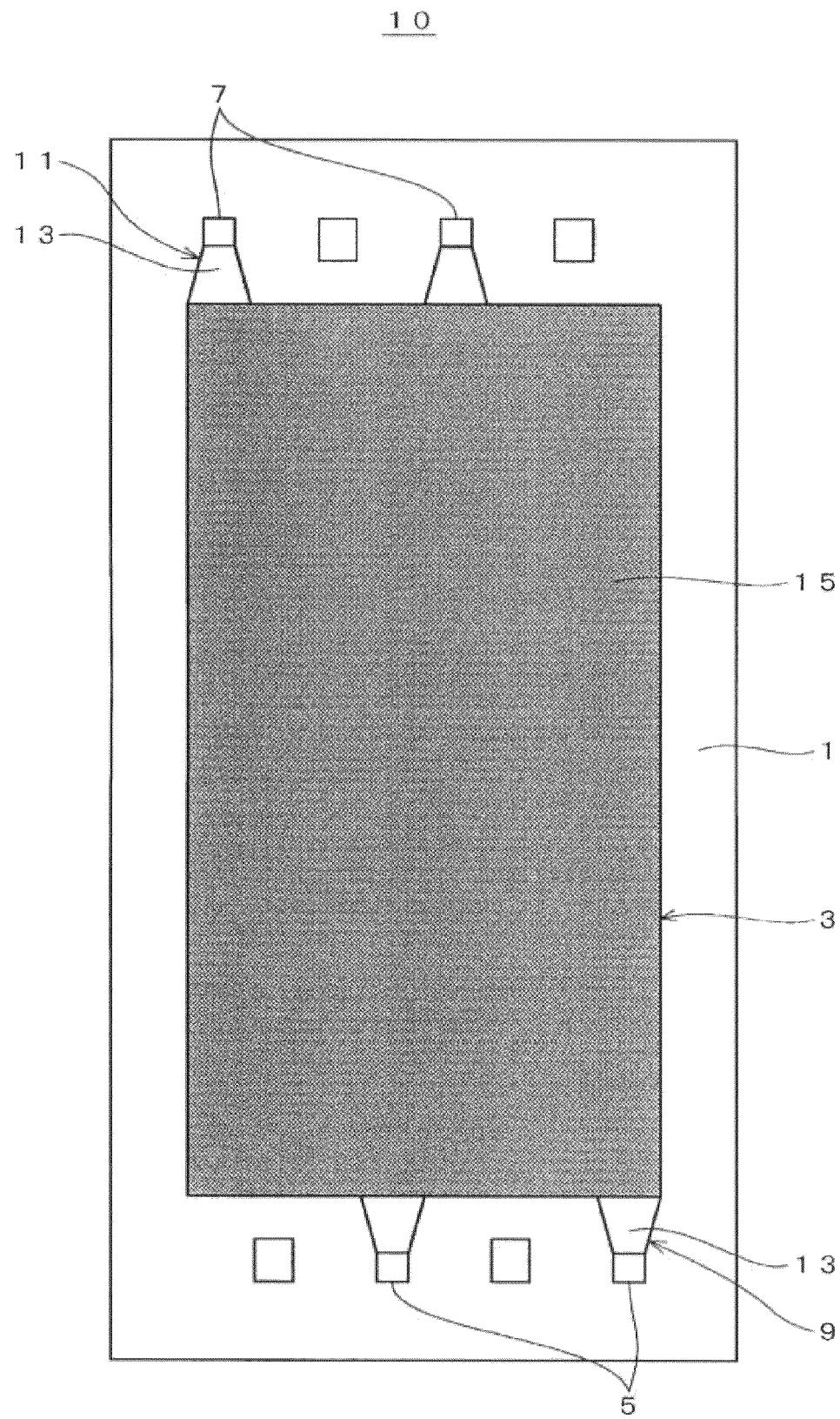
FIG. 1 is a rear view of a chamber frame according to the present invention.
Figure 2:
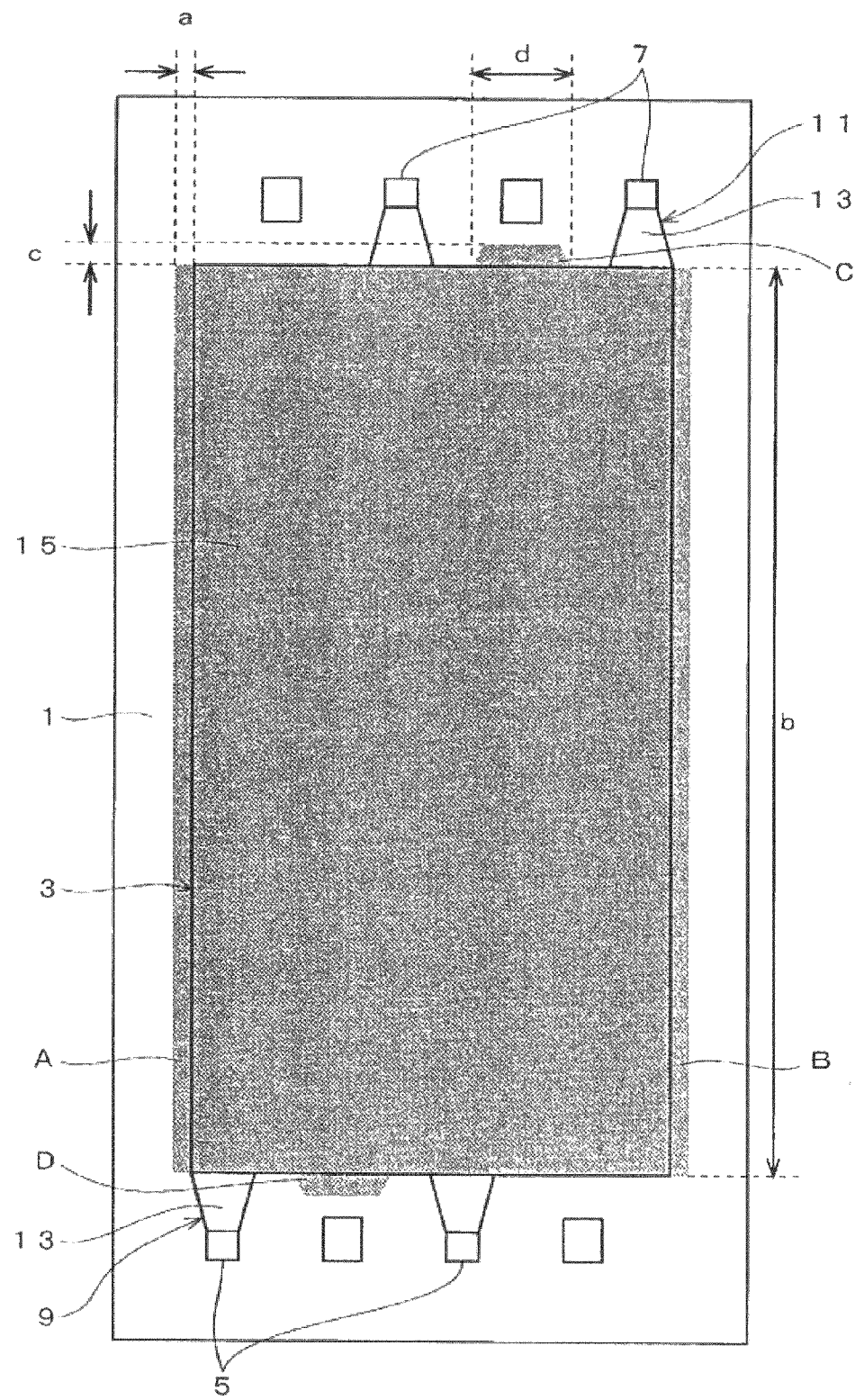
FIG. 2 is a front view of the chamber frame.

Now, embodiments of the present invention will be described. The chamber frame according to an embodiment of the present invention is configured as shown in FIGS. 1 and 2. FIG. 1 is a rear view of the chamber frame, and FIG. 2 is a front view of the chamber frame. In FIG. 1, the chamber frame 1 is formed in a picture frame shape with a rectangular opening 3 formed in a central part thereof. The chamber frame also has liquid supply ports 5 and liquid discharge ports 7 formed therein so as to communicate with the opening 3 through communicating passages 9 and communicating passages 11. The communicating passages 9 and the communicating passages 11 have distributors 13 fitted thereinto in order to secure liquid paths. Each of the distributors 13 has a plurality of unshown fine grooves engraved so as to form liquid paths for communicating the liquid supply ports 5 and the liquid discharge ports 7 to the opening 3.

Each of the distributors 13 is excellent in heat resistance and liquid dispersion property, and has a structure to prevent internal leak. Each of the distributors 13 may be produced by injection molding.

The frame 1 may be produced by punching a certain material by a predetermined punch.

The opening 3 has a net 15 disposed therein to serve as a spacer in the flow path portion of the chamber frame 10. This net is disposed to prevent an anion exchange membrane and a cation exchange membrane from being brought into contact with each other and to disperse a liquid to be treated.

As shown in FIG. 2, the net 15 is welded into parts of the frame adjacent to the opening 3 at two welded portions A and B in a vertical direction and at about two welded portions C and D in a width direction. Each of the welded portions A and B is welded to the frame in a range having a length b equal to the vertical length of the opening 3 and a width a. In other words, the net 15 has right and left edges extending by the width a in comparison with the horizontal length of the opening 3.

On the other hand, each of the welded portions C and D is welded to the frame in a range having a vertical length c and a width d. In other words, the net 15 has upper and lower edges partly extending by the vertical length c in comparison with the vertical length of the opening 3. It should be noted that the welded portions C and D may be omitted, depending on the size of a chamber 10.

The frame 1 is made of a thermoplastic resin, and the thermoplastic resin in the present invention may also cover a thermoplastic elastomer which contains a rubber component in a thermoplastic resin matrix. The frame is made of preferably an olefin-based thermoplastic resin, particularly preferably an olefin-based thermoplastic elastomer. The olefin-based thermoplastic elastomer may be a product manufactured by Mitsubishi Chemical Corporation and commercially available under "ZELAS" (product name).

The frame 1 may be made of an olefin-based, a urethane-based, a styrene-based or a polyester-based thermoplastic resin, or another thermoplastic resin, which has a softening temperature of not lower than 120° C. and a hardness of not lower than 50 in material hardness (JIS K6301, A type) in terms of heat resistance and sealing property in clamping.

The dimensions of the frame 1 may be properly determined, depending on the quantity of a liquid to be treated or another factor.

The net 15 is made of preferably polypropylene or polyethylene in terms of softening temperature during heat welding.

The net is welded into the welded portions A, B, C and D by impulse-welding.

Next, explanation will be made about a system for welding the net into the welded portions A, B, C and D by impulse-welding.

Figure 3:
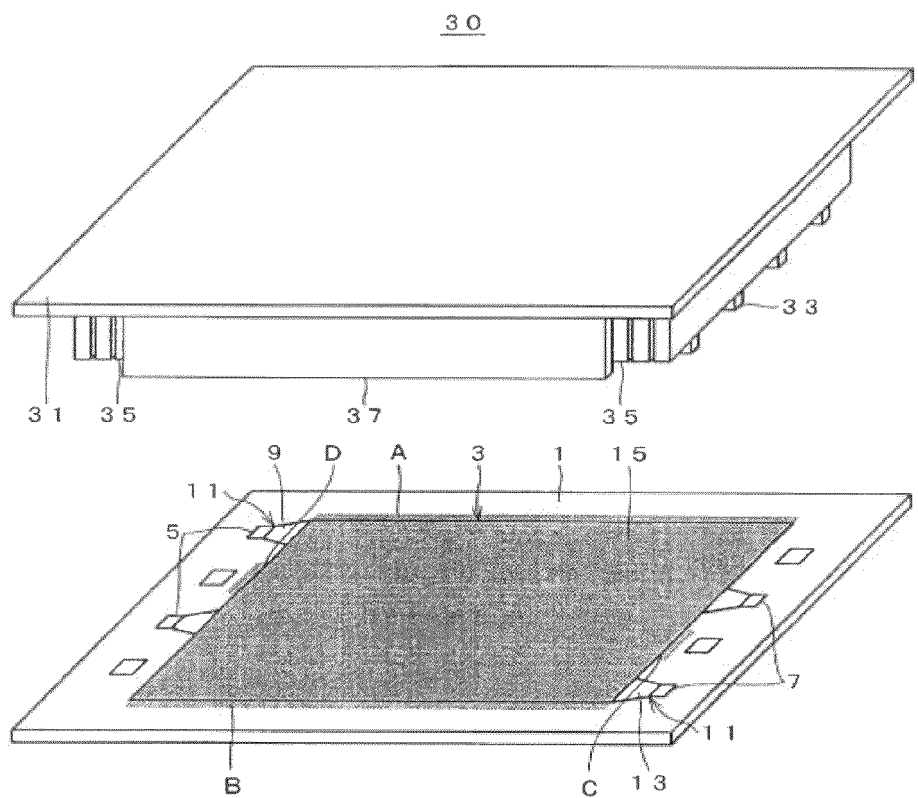
FIG. 3 is a schematic view of an impulse welder.

As shown in FIG. 3 as a schematic view of an impulse welder, the frame 1 is placed on an unshown table of the impulse welder 30.

The impulse welder 30 has four distributors welding heaters 33 disposed on each of right and left portions of a rear side of a top plate 31 thereof in order to weld the distributors 13 to the communicating passages 9 and weld the distributors 13 to the communicating passages 11. The impulse welder 30 also has a single net-welding heater 35 disposed on each of right and left portions of the rear side in order to weld the net 15 into the frame 1 at the welded portions C and D.

Further, the impulse welder has a single net-welding heater 37 disposed on each of front and depth sides on the rear side of the top plate 31 in order to weld the net 15 into the frame 1 at the welded portions A and B.

In order to facilitate the positioning of the welded portions, each of the distributor welding heaters 33, the net-welding heaters 35 and the net-welding heaters 37 has a width of preferably 3 mm to 12 mm, more preferably 5 mm to 10 mm, taking into account dimensional accuracy of a chamber frame sheet and another factor. On the other hand, each of the net-welding heaters 37 has a length of preferably 200 mm to 2,000 mm, taking into account the length b, although the length varies on the dimensions of the chamber frame 10. It should be noted that such a wide range of welding has not been difficult to be realized by the conventional ultrasonic welders.

Now, the method for producing a chamber frame, which is carried out in accordance with an embodiment of the present invention, will be described.

First, as a first step, a sheet made of an olefin-based thermoplastic elastomer (e.g. a product manufactured by Mitsubishi Chemical Corporation and commercially available under "ZELAS") is cut in a picture frame to form the frame 1 for the chamber frame 10.

At the time of cutting the sheet in a procure frame, the liquid supply port 5 and the liquid discharge port 5 are also simultaneously formed in the frame 1.

Next, as a second step, the cut frame 1 is set on the unshown table of the impulse welder 30, the distributors 13 are fitted into the communicating passage 9 and the communicating passages 11, and the net 15 is positioned so as to cover the opening 3. At that time, the net 15 is set on the table such that the net 15 has a wider area than the opening 3 by the welded portions A and B and the welded portions C and D.

The width a of the welded portions A and B and the width c of the welded portions C and D are 3 to 10 mm, preferably 3 to 5 mm, taking into account the thermal deformation in the chamber frame 10 and the strength of a net mounting portion.

Next, a third step, the welded portions A and B, and the welded portions C and D are subjected to impulse welding.

The heating press has a temperature of 140° C. to 220° C., preferably 150° C. to 165° C., which slightly varies on the material of a used net and the material of a used chamber frame sheet, and which is required to be adjusted so as to be matched with the pressure applied by the heating press and with the heating period of time.

The impulse welder has a pressure applied to the heater portions at 0.05 MPa to 2.0 MPa per unit area, preferably 0.5 MP to 1.0 MPa per unit area at the time of carrying out heat-pressing, taking into account deformation in the heat-welded portions and thickness accuracy. With regard to the heating period of time by the heating portions, it is preferably 0.5 sec to 5 sec, taking into account avoidance of a thermal deformation in the chamber frame 10, thickness accuracy and workability, although the heating period of time varies on the sheet material of the chamber frame 10, the material of the net, the heating temperature and the applied pressure.

Mounting of the net 15 as a spacer and mounting of the distributors 13 are carried out simultaneously by a single pressing operation.

After that, as a fourth step, the welded portions of the net are deburred, and correction work is performed on defects.

Although FIG. 3 shows a case where impulse welding is carried out from the front side of the chamber frame with regard to all of the welded portions A and B and the welded portions C and D, impulse welding may be carried out from the front side of the chamber frame with regard to the welded portions A and B while impulse welding may be carried out from the rear side of the chamber frame with regard to the welded portions C and D, for example.

EXAMPLES

Now, the present invention will be described in reference to an example. It should be understood that the present invention is by no means limited to the example.

Example 1

Now, explanation will be made about Example 1.

First, as a first step, a sheet made of an olefin-based thermoplastic elastomer (product manufactured by Mitsubishi Chemical Corporation and commercially available under "ZELAS") as a sheet-like thermoplastic resin was cut in a picture frame having an outer horizontal size (width) of 180 mm and a vertical size (length) of 550 mm with a central opening having a horizontal size of 130 mm and a vertical size of 380 mm to produce a frame 1 for a chamber frame 10 (see FIGS. 1 and 2). The frame 1 had two liquid supply ports sized to be 17 mm square and two liquid discharge ports sized to be 17 mm square.

Next, as a second step, the frame 1 was set on the impulse welder 30, and four distributors 13 (having a length of 20 mm) and a net made of polypropylene 15 were put in place.

The distributor-welding heaters 33, the net-welding heaters 35 and the net-welding heaters 37 (having a length of 400 mm) used in this Example had a width of 5 mm. As a third step, an impulse welder (manufactured by Fuji Impulse Co., Ltd.) was used to carry out impulse welding at a heating temperature of 155° C. under an applied pressure of 1.0 MPa for 2 seconds (see FIG. 3). The net made of polypropylene 15 was welded to the frame 1 with a width of 5 mm from an inner peripheral edge of the opening of the frame 1 (see a and c in FIG. 2).

After that, as a fourth step, the welded portions of the net was deburred, and correction work was performed on defects. Via these four steps, a chamber frame 10 was obtained as a product according to the present invention. The chamber frame had a sheet thickness of 0.637 mm.

Comparative Example 1

A conventional method for producing a chamber frame will be described in the order of respective steps as a Comparative Example 1.

First, as a first step, a sheet made of an olefin-based thermoplastic elastomer (a product manufactured by Mitsubishi Chemical Corporation and commercially available under "ZELAS") was cut in a picture frame having a width of 180 mm and a length of 550 mm to form the frame 1 for a chamber frame 10.

Next, as a second step, four distributors 13 separately produced were fitted into the chamber frame at two of upper and lower positions of the chamber frame by injection welding. This operation required two steps because the mounting was carried out at the upper and lower positions of the chamber frame.

Then, as a third step, a polyolefin net (e.g. product manufactured by Tokyo Polymer Kabushiki Kaisha) was cut as a spacer for the flow path of the chamber frame.

After that, as a fourth step, the polyolefin net was positioned on an inner side of the chamber frame in a picture frame with the distributors 13 fitted thereinto and was temporarily fitted to the chamber frame by the ultrasonic spot welder.

Subsequently, as a fifth step, the sheet made of an olefin-based thermoplastic elastomer and the polyolefin net, which was prepared as the semi-finished product with the net temporarily fitted thereto, were integrally welded together by six divided steps by the ultrasonic spot welder. Thus, six steps were needed.

Finally, as a fourth step, the welded portions of the net were deburred, and correction work was performed on defects.

This conventional chamber frame was obtained by these twelve steps.

As described, the number of the steps required for implementing Example 1 is simplified to one-third in comparison with the steps required for implementing Comparative Example 1, reducing labor costs required for producing a product according to the present invention.

Now, the evaluation results of the performance quality regarding each of Example 1 and Comparative Example 1 will be shown in Table 1.

The chamber frame in each of the examples had a sheet thickness of 0.637 mm.

TABLE 1

|  | Sag (mm) | Thickness of Welded Portions (mm) | Standard Deviation (mm) | Quantity of External Leakage (NL/h) |
| --- | --- | --- | --- | --- |
| Chamber Frame in Example 1 | 0.82 | 0.621 | 0.005 | 0.12 |
| Chamber Frame in Comparative Example 1 | 1.65 | 0.634 | 0.004 | 0.35 |

It should be noted that the values in the respective items shown in Table 1 were measured by the following methods.

Figure 4:
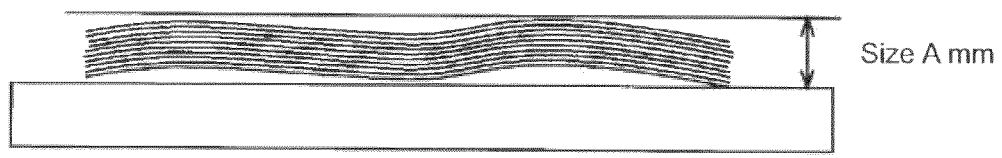
FIG. 4 is a view showing how to measure a sagging size.

With regard to the sag, evaluation was carried out about the deformation in the chamber frames which had the net fitted thereinto. The quantity of sag in each example was found by measuring a thickness size A in such a state where ten of the chamber frames with the net fitted thereinto were stacked one after another in a sagging manner as shown in FIG. 4, measuring a thickness size A in such a state where ten of the unsagged chamber frames with no net fitted thereinto were stacked one after and applying the measured values to the following formula 1:

Sag=(thickness size $A$−the total thickness of ten staked chamber frames with no net fitted thereinto)     [Formula 1]

The thickness sizes are indexes of sealing property and damage to membranes. It is important that the thickness of the parts of a chamber frame with a net fitted thereinto be equal to or thinner than the sheet thickness of a peripheral part of the chamber frame. The thickness sizes were measured by a dial thickness gauze (marked at every 0.01 mm).

With regard to the external leakage, it is the best in terms of chamber frame performance that there is no leakage. With regard to the quantity of the external leakage, the measurement was carried out by alternately stacking ten chamber frames and ten exchange membranes to form a stacked unit, locating clamps on both ends of the stacked unit, clamping the stacked unit under 0.6 MPa by the clamps, and applying an air pressure of 0.2 MPa to the inside of the chamber frames, followed by measuring the quantity of air leakage outside the unit.

As seen from Table 1, Example 1 exhibits better results in terms of not only performance quality but also sag, thickness accuracy and the quantity of external leakage than Comparative Example 1. Example 1 also exhibits simplification in production process to achieve significant cost reduction due to a decrease in the working steps for production.

INDUSTRIAL APPLICABILITY

The present invention is applicable to the production of a chamber frame for a dialyzer, which has a stable quality, is inexpensive and is excellent in sealing property and heat resistance.

This application is a continuation of PCT Application No. PCT/JP2012/077793, filed on Oct. 26, 2012, which is based upon and claims the benefit of priority from Japanese Patent Application No. 2011-237130 filed on Oct. 28, 2011. The contents of those applications are incorporated herein by reference in their entireties.

REFERENCE SYMBOLS

1: Frame
3: Central Opening
5: Liquid Supply Port
7: Liquid Discharge Port
9 and 11: Communicating Passage
10: Chamber Frame
13: Distributor
15: Net
30: Impulse Welder
31: Upper Plate
33: Distributor-welding Heater
35 and 37: Net-welding heater

What is claimed is:

1. A method for producing a chamber frame for a dialyzer, which includes a frame having a central opening serving as a flow path for a liquid to be treated, a liquid supply port and a liquid discharge port and made of a thermoplastic resin,
and a resin net welded into a peripheral part of the frame adjacent to the central opening;
comprising integrating the net to the frame with a width of not larger than 10 mm from an inner peripheral edge of the central opening at a heating temperature of 140° C. to 220° C. by impulse heat-welding.

2. The method according to claim 1, wherein a heater used for the impulse heat-welding has dimensions of 200 mm to 2,000 mm in length and 3 mm to 12 mm in width, and has a heating period of time of 0.5 sec to 5 sec with a pressure of 0.05 MPa to 2.0 MPa per unit area being applied.

3. The method according to claim 1, wherein the frame further includes a distributor disposed in a communicating passage between the central opening and the liquid supply port or between the central opening and the liquid discharge port, and
the impulse heat-welding is employed such that the distributor is integrally welded into the frame at the same time as the net is welded to the frame.

4. The method according to claim 2, wherein the frame further includes a distributor disposed in a communicating passage between the central opening and the liquid supply port or between the central opening and the liquid discharge port, and
the impulse heat-welding is employed such that the distributor is integrally welded into the frame at the same time as the net is welded into the frame.

5. The method according to claim 1, wherein the thermoplastic resin is a thermoplastic elastomer.

* * * * *